Figure 1:
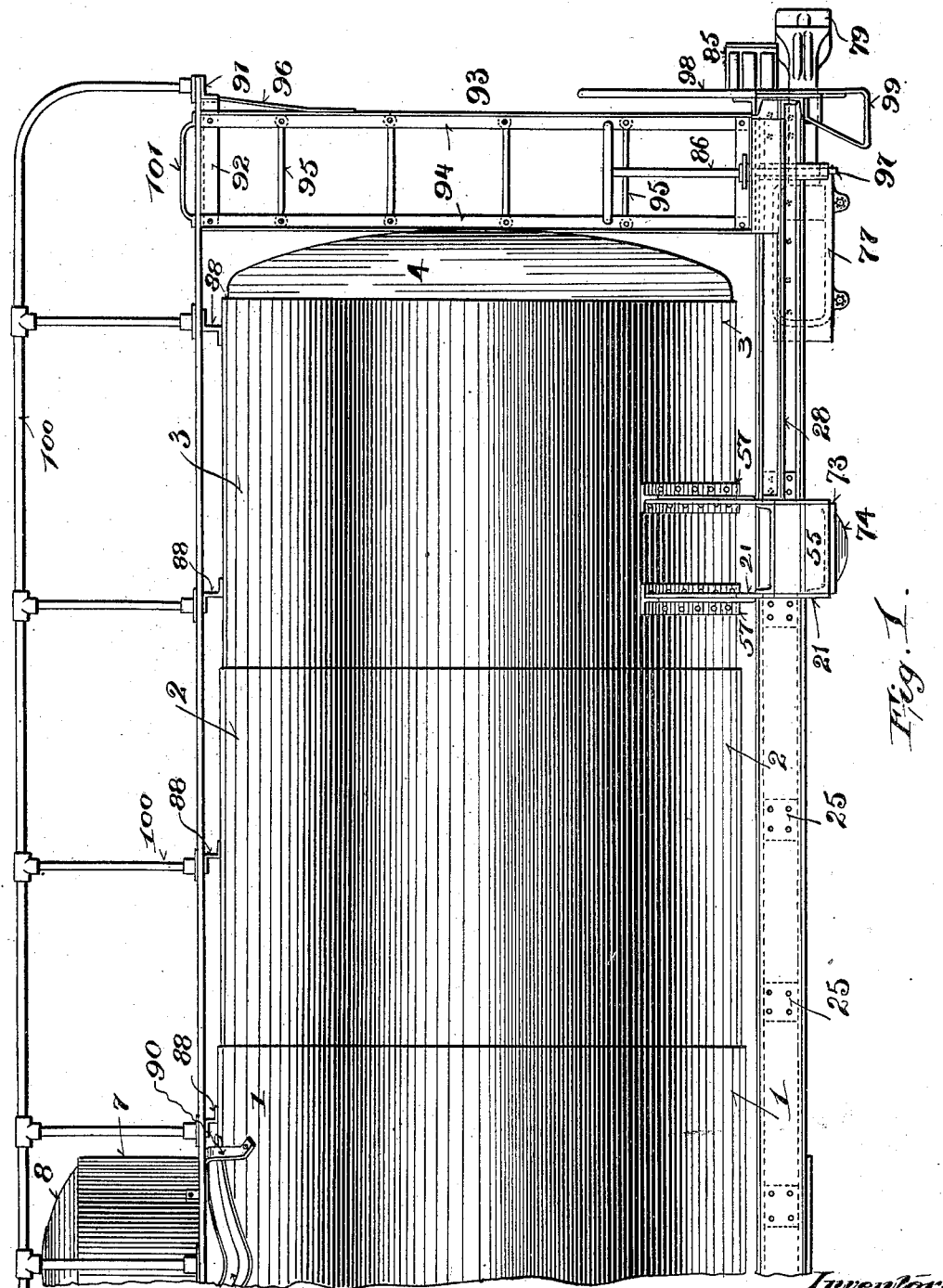

No. 747,278. PATENTED DEC. 15, 1903.
C. VANDERBILT.
TANK CAR AND METALLIC CAR CONSTRUCTION.
APPLICATION FILED NOV. 22, 1901.
NO MODEL. 8 SHEETS—SHEET 1.

No. 747,278. PATENTED DEC. 15, 1903.
C. VANDERBILT.
TANK CAR AND METALLIC CAR CONSTRUCTION.
APPLICATION FILED NOV. 22, 1901.
NO MODEL. 8 SHEETS—SHEET 4.

Witnesses: Inventor,
Cornelius Vanderbilt,
by Joseph L. Levy
atty

No. 747,278. PATENTED DEC. 15, 1903.
C. VANDERBILT.
TANK CAR AND METALLIC CAR CONSTRUCTION.
APPLICATION FILED NOV. 22, 1901.
NO MODEL. 8 SHEETS—SHEET 5.
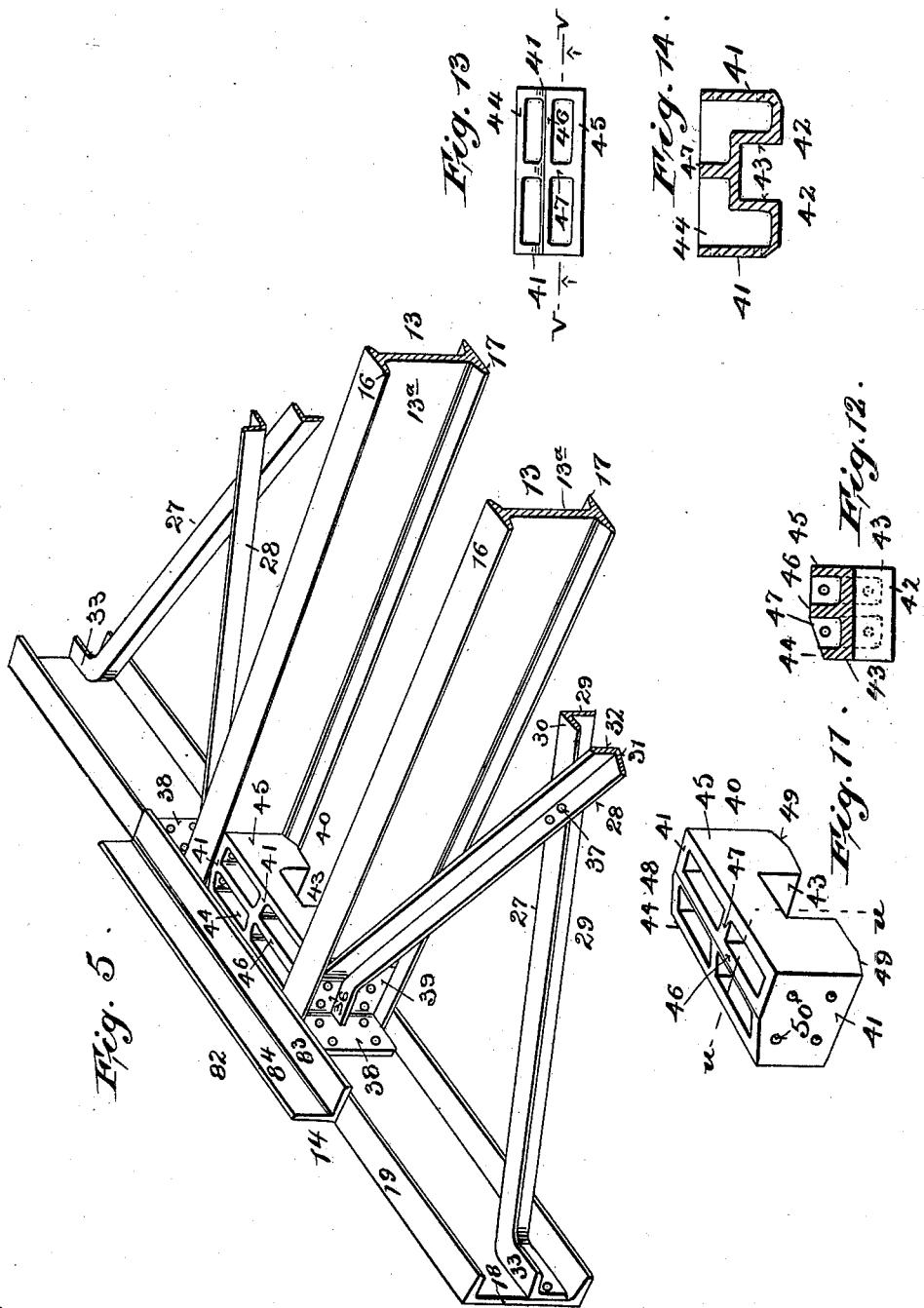

No. 747,278. PATENTED DEC. 15, 1903.
C. VANDERBILT.
TANK CAR AND METALLIC CAR CONSTRUCTION.
APPLICATION FILED NOV. 22, 1901.
NO MODEL. 8 SHEETS—SHEET 6.
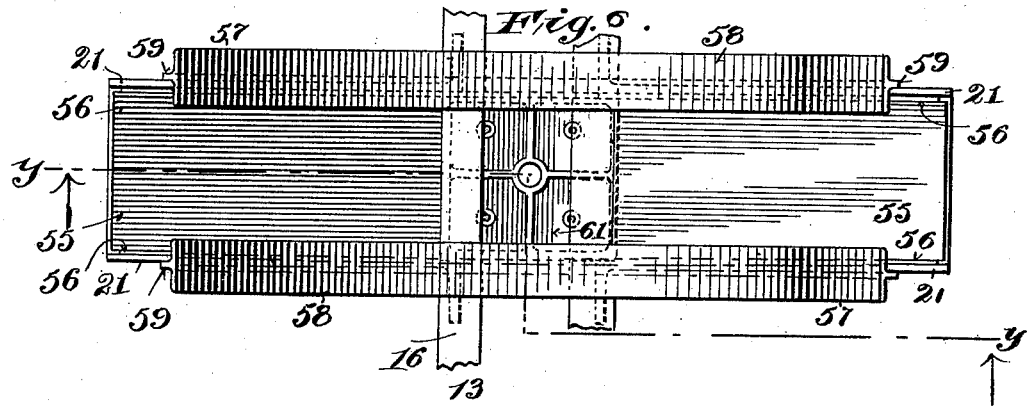
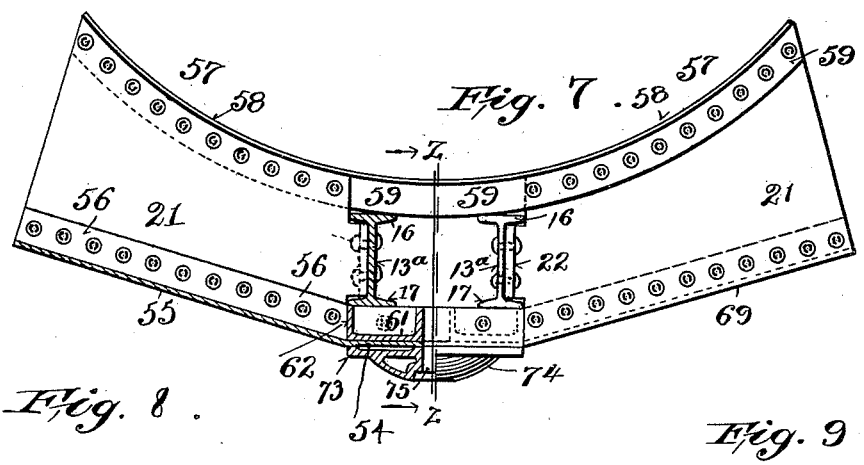
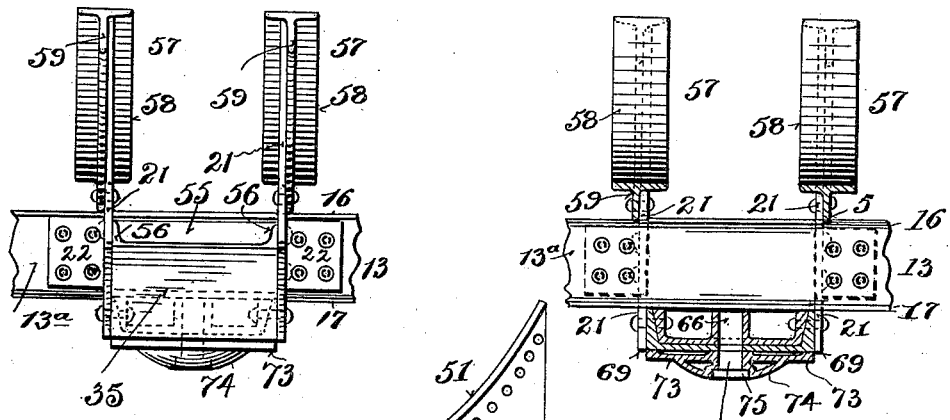
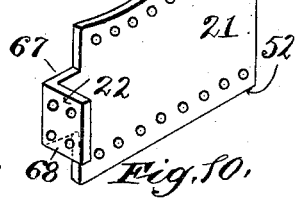
Witnesses,
Inventor,
Cornelius Vanderbilt
by Joseph L. Levy
atty No. 747,278. PATENTED DEC. 15, 1903.
C. VANDERBILT.
TANK CAR AND METALLIC CAR CONSTRUCTION.
APPLICATION FILED NOV. 22, 1901.
NO MODEL. 8 SHEETS—SHEET 7.
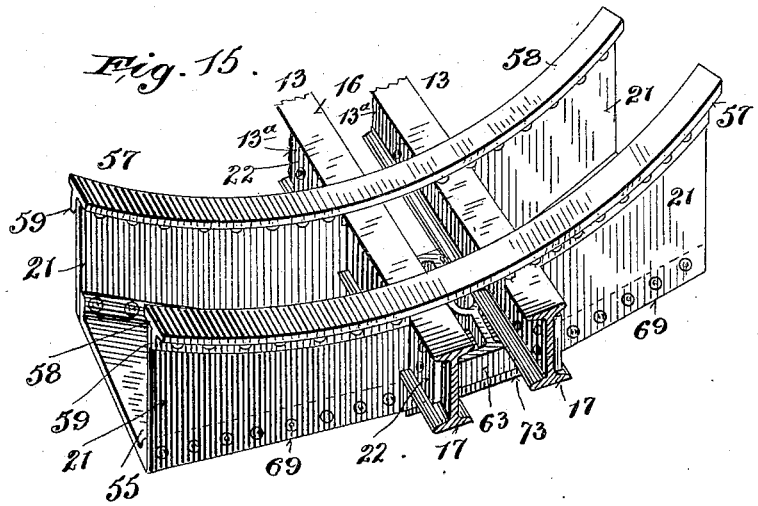
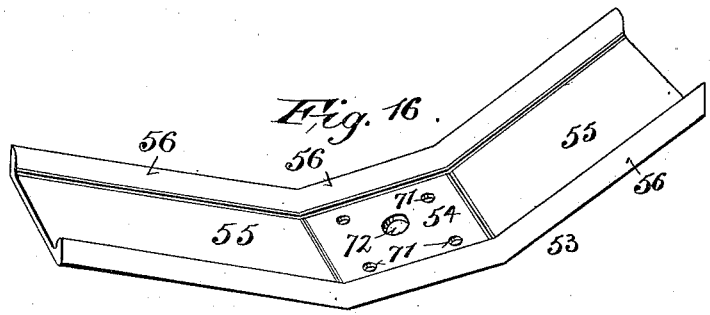
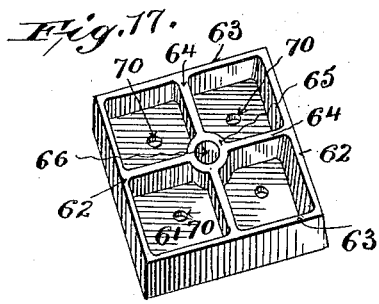
WITNESSES
INVENTOR.
Cornelius Vanderbilt.
BY his ATTORNEY No. 747,278. PATENTED DEC. 15, 1903.
C. VANDERBILT.
TANK CAR AND METALLIC CAR CONSTRUCTION.
APPLICATION FILED NOV. 22, 1901.
NO MODEL. 8 SHEETS—SHEET 8.
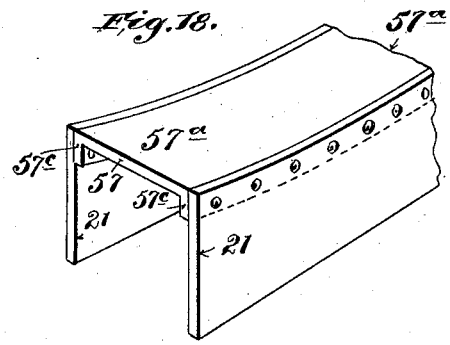
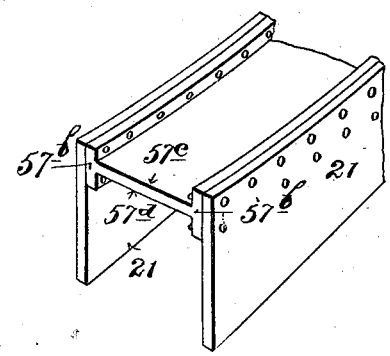
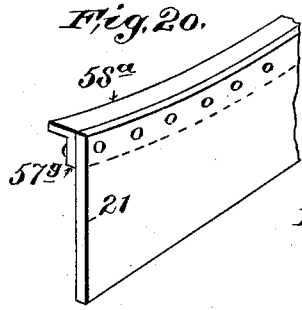
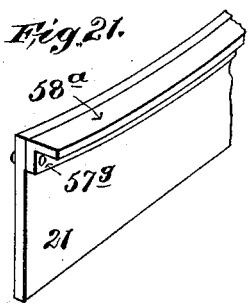
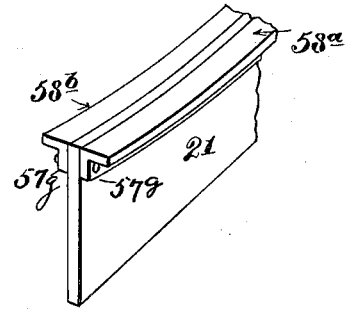
Witnesses:
C. W. Benjamin
Chas. G. Hensley
Inventor:
Cornelius Vanderbilt
by Joseph L. Levy
atty No. 747,278.                                                    Patented December 15, 1903.

UNITED STATES PATENT OFFICE.

CORNELIUS VANDERBILT, OF NEW YORK, N. Y.

TANK-CAR AND METALLIC-CAR CONSTRUCTION.

SPECIFICATION forming part of Letters Patent No. 747,278, dated December 15, 1903.

Application filed November 22, 1901. Serial No. 83,262. (No model.)

*To all whom it may concern:*

Be it known that I, CORNELIUS VANDERBILT, a citizen of the United States, and a resident of the city of New York, borough of Manhattan, county and State of New York, have invented certain new and useful Improvements in Tank-Car and Metallic-Car Construction, of which the following is a specification.

My invention has reference to the improvements in the construction of railroad-cars, and more specifically to that class of cars wherein a cylindrical (or other appropriately-formed) tank is employed for the transportation of oil, grain, &c., which improvements may also have beneficial application to railroad-car construction wherein the cars are employed for other purposes and which may be in whole or in part built up of metal.

The object of my invention is to provide a structure having a maximum of carrying capacity and strength with a minimum amount of weight in the volume of material utilized; and to this end I have in devising the structure hereinafter described paid special reference to its organization, to the end that commercial forms of iron may be largely, if not wholly, employed.

Certain features of improvement herein illustrated and described, specifically those relating to the details of construction of the body-bolster, are not claimed herein, they forming the subject-matter of another application, filed the 12th day of March, 1902, Serial No. 97,919, to which cross-reference is here made.

The embodiment of my present invention, wherein the sought-for objects are attained, resides in the novel features of construction and combination of parts hereinafter described, and further pointed out in the claims.

Figure 2:
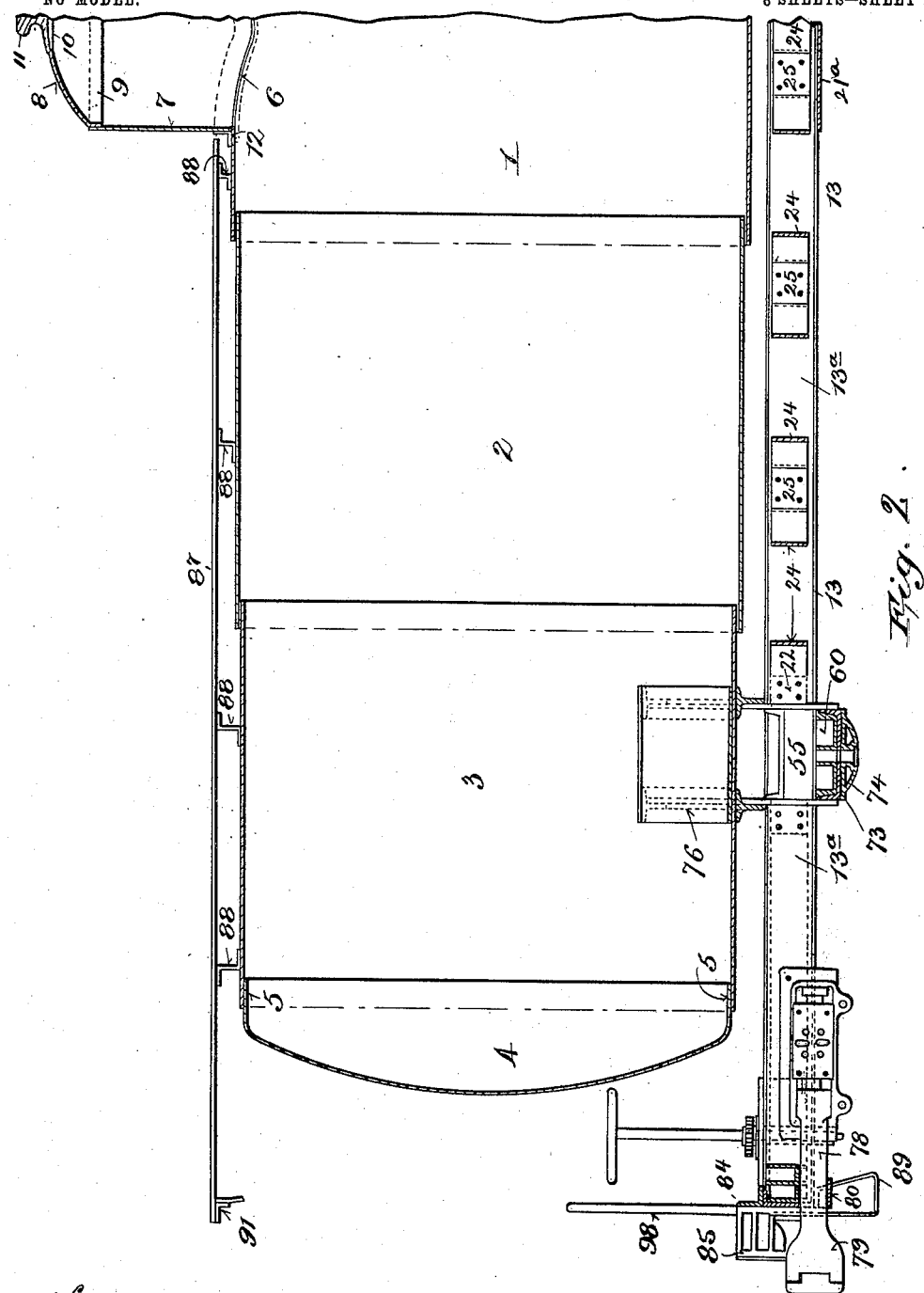
Figure 3:
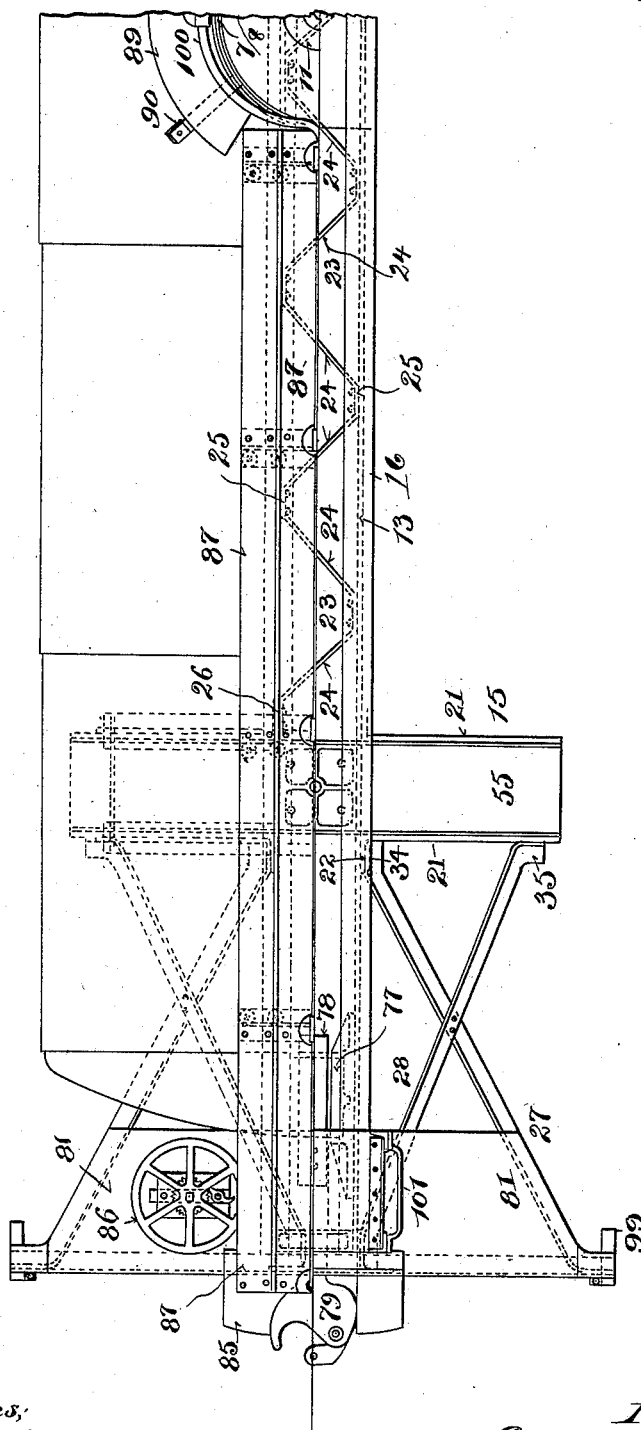
Figure 4:
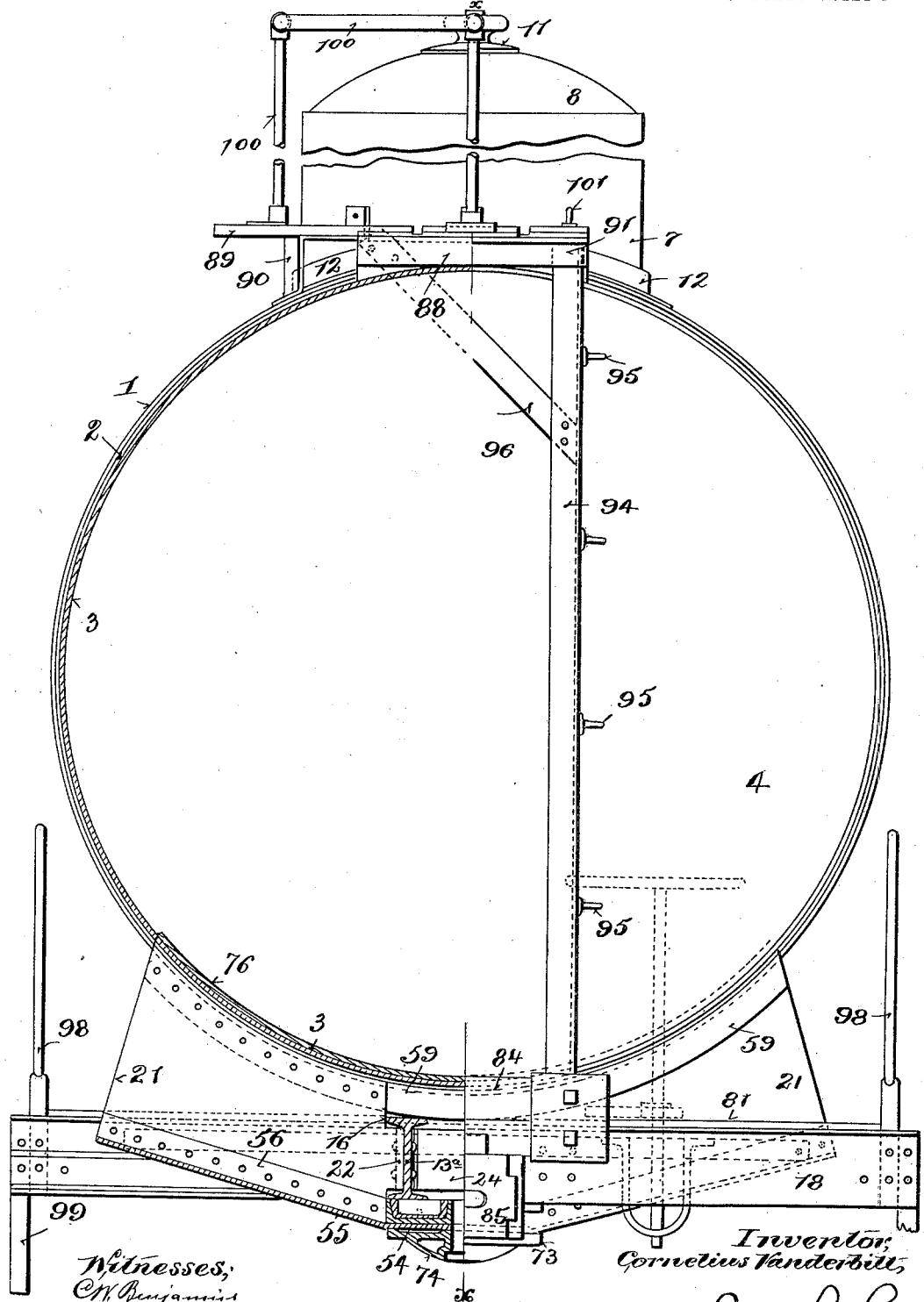

In the drawings forming part of this specification, Figure 1 is a side elevation of one half of the tank-car embodying my improvements minus the truck, the other half being constructed identical. Fig. 2 is a longitudinal sectional elevation taken substantially on the line $x\ x$, Fig. 4, Figs. 1 and 2 when taken together showing a complete structure. Fig. 3 is a plan view of Fig. 2. Fig. 4 is an end elevation, one-half being in sectional elevation. Fig. 5 is a perspective elevation, enlarged, of one end of the body-framing. Fig. 6 is a plan view, enlarged, of the body-bolster and a portion of the framing. Fig. 7 is a side elevation of the latter, partly in section, the section being taken substantially on the line $y\ y$, Fig. 6. Fig. 8 is an end elevation of the body-bolster. Fig. 9 is a sectional elevation of the same, taken on the line $z\ z$, Fig. 7. Fig. 10 is a perspective view of one of the bolster vertical plates or wings. Fig. 11 is a perspective view of one of the frame-castings or stiffening-blocks. Fig. 12 is a sectional view on the line $u\ u$, Fig. 11. Fig. 13 is a plan view of the same. Fig. 14 is a longitudinal sectional elevation taken on the line $v\ v$, Fig. 13, looking in the direction of the arrow. Fig. 15 is a perspective view of the bolster and a part of the longitudinal sills. Fig. 16 is a like view of the base-plate for the bolster, and Fig. 17 is a like view of the sill-chair. Fig. 18 is a perspective view of a modified form of bolster, only the upper portion being shown; and Figs. 19, 20, 21, and 22 like views of further modifications.

Similar numerals of reference indicate corresponding parts throughout the several views.

The tank, which may be of otherwise or conventional construction, in the present instance is made up of courses or rings of telescopic or gradually-decreasing diameter from the center course outwardly toward each end—that is to say, the courses 1 2 3 and of any suitable number are circular or other appropriate shape, are of maximum diameter at the center of the course 1, and each succeeding course 2 3 extending toward the two ends of the tank is of smaller diameter, so that the end of each course from the center one can be inserted into the other. The end headers 4 each have an annular flange 5, Fig. 2, adapted to be inserted bodily into the end course 3, all of the courses and headers being riveted together in the position illustrated. The center course 1 is provided with an opening 6, Fig. 2, over which is located the drum-section 7 of the dome or manhole, the crown-piece 8 having a flange 9 inserted interiorly into the drum-piece and riveted thereto and an opening 10 in the top, provided with a suitable cover 11, a flange-securing strip 12 being placed in the angle formed by the meeting of the sheeting of the course 1 and the drum 7 and riveted to both parts, thereby securely supporting the dome in place.

*The body-framing.*—I have devised the framing with the special object of securing lightness, rigidity, and strength of structure, a small number of parts, and to utilize as far as possible commercial forms of iron. A further object in devising the body-frame, which includes (generically) a body-bolster and end sills, is to provide through the peculiarities of construction of the bolster a very low-placed car-body or tank, the structural features of the bolster enabling the tank to be brought very low down relatively to the center of gravity of the truck.

The organization of the body-framing is such that considerable clearance is left for the operative movement of the truck and frame without conflict.

The body-framing is constructed as follows: At 13 are the longitudinal sills comprising two I-beams extending from end to end of the frame between the end sills 14 and closely placed together relative to the longitudinal center of the frame, the I-beams having upper and lower longitudinally-disposed flanges 16 17 and a vertical web 13$^a$. The end or cross sills 14, also a part of the frame, consist of channel-beams having a vertical web 18 and inwardly-extending horizontal webs 19 20. The main elements of the body-frame are the longitudinal sills 13, the end sills 14, and the intermediate body-bolsters, (generically lettered 15,) with the features of relation and construction hereinafter described as subsidiary elements. The sills pass through and are secured to the bolsters, as hereinafter described, the latter having as a part of their construction plates or wings 21, having angular ears 22, which are riveted to the vertical webs 13$^a$ of the sills 13. It will be seen from Figs. 1, 2, and 3 that the ends of both the bolsters extend outwardly from the sills 13 parallel with each other and are not connected, as has been the usual practice, by the usual side or outer sills, which latter are absent in my construction, and to firmly tie the sills together and to maintain the parallelism of the end of the sills the following construction is employed: Intermediate of the bolsters the sills 13 are tied together transversely by the zigzag or diagonal braces, consisting, preferably, of a continuous bar bent to provide divergent cross-bars 24 and intermediate flat sections 25 (from which the bars 24 diverge) and which are riveted to the web 13$^a$ of the sills 13, the end 26 of the brace, the inner ear 22 of the wing 21, (at opposite sides of the longitudinal center,) and the web 13$^a$ being riveted and bolted together. Beyond the bolsters—that is, between the end sills and the bolsters—the brace 23 is preferably omitted, the end of the end sills and the bolster being tied together and to the sills 13, as follows:

At 27 28 are two diagonally-disposed angle-iron braces, thereby being a set of these braces at each end of the frame and between each of the bolsters and end sills, each brace having horizontal and upright webs 29 30 31 32 and angularly-disposed ends 33 34 35 36. The braces are crossed intermediate of their ends, their webs 30 31 facing, and at the point of crossing they are riveted together, as at 37. The outer end 33 of the brace 27 is secured by rivets passing through the web 29 and the web 18 of the end sill adjacent to the lower flange 20, so that this end lies within and is protected by the overlapping flanges 19 20 of the end sill, and the diagonally-opposite end of this brace is disposed in the same plane as the end sills 13 and is secured through the web 29 to the tongue 22 of the bolster wing or plate 21. The sills 13 have their ends located in the channel of the end sill 14, so that the flanges 19 20 overlap their ends, and they are secured to the end sills and held spaced apart as follows: At the outer angle formed by the sills 13 14 and within the flanges 16 17 19 20 are angle-plates having arms 38 39 disposed in line with the webs 13$^a$ and 18 of the sills.

At 40, Figs. 11 to 14, is an end casting or rectangular block having integrally-formed side walls 41, a base-web 42 upset laterally to form a groove 43, front and rear walls 44 45, and cross strengthening-webs 46 47. This casting is set in between the sills 13 to form a thimble or distance-block to preserve the parallelism of the sills and brace the connection of the end sills thereto, (and incidentally to support the draw-bar hereinafter referred to,) the forward portions of the walls 41 44 and web 47 being inclined downwardly, as at 48, and the walls 41 and web 42 at the lower angle being inclined upwardly, as at 49, all so as to allow of the casting or "thimble" (as it will hereinafter be called) setting snugly within the channels of the sills 13 14, the walls 41 44 abutting directly against the webs 13$^a$ 18 and allowing the flanges 16 17 19 20 to overlap, the latter walls 41 being provided with holes 50.

The outer end 36 of the brace 28 is disposed in the same plane as the web 13$^a$ of the sills 13, and by riveting the arm 38 of the angle-plate to the web 18 of the end sill and the web 32 of the brace 28 and the walls 41 of the thimble 40, respectively, to the web 13$^a$ a strong and firm union of these parts is had, the diagonally opposite and inner ends 35 of the braces being disposed in the same place as the bolster and secured through its web 32 to the wing or plate 21 thereof.

The foregoing, which includes the bolster, (exclusive of the specific construction,) forms a very strong, light, and rigid frame.

My improvements as embodied in the bolster are as follows: In plan Figs. 6 and 15 it forms a lateral channel, the upper edges of which are downwardly depressed or segmentally disposed on lines concentric with the tank course immediately above it and which bolsters (both of which are constructed identical) form cradles in which the tank rests and to which it is secured. The bolster comprises, as embodied herein, three parts: the wings 21, each having their upper edges 51 formed on the segment of a circle concentric with that of the tank course 3, and an upwardly and outwardly extending lower edge 52, which in the complete bolster allows clearance for the curving of the truck and bolster side bearings; the channel-iron bed or base plate 53, having a central flat or plane section 54 and upwardly and outwardly converging end pieces 55, bordered at the sides by the upwardly-extending flanges 56; the segmental T-irons or cradle-pieces 57, having a horizontal flange 58 disposed to conform to the curve of the tank course and concentric therewith and the lower pendent intermediate web 59, and the compression or sill chair 60, having a lower web 61, side and end webs 62 63, and cross-webs 64, merging into an enlargement 65, having an aperture 66.

Instead of using the curved angle-irons 57 to form cradles to immediately support the tank and to afford means for securing the liner 76 and tank to the wings 21, I can avail myself of the following modifications in whole or in parts without departing from the underlying bolster scheme of construction.

In Fig. 18 an inverted channel-iron 57$^a$, having its cross-web 57$^b$ curved to conform to that of the tank or its course, is set in between the wings 21 and both parts secured together by rivets (or otherwise) passing through the wings and the pendent curved flanges 57$^c$. This construction efficiently ties the wings 21 together and forms a cradle in which the tank-car rests, the liner 76 and tank being riveted to the web 57$^b$.

In Fig. 19 the wings are transversely tied together by an I-beam 57$^d$, the curved web 57$^e$ of which is horizontally disposed, the curved flanges 57$^b$ being riveted to the wings 21.

In Figs. 20, 21 the curved angle-irons are used to take the place of the T-irons 57, the curved web 58$^a$ taking the tank and the flange 57$^g$ being riveted to the wings 21. The curved angle-irons may be secured on the inside or outside of the wings 21, as shown in Figs. 20, 21, respectively.

In Fig. 22 a substitute for the T-irons 57 is made by riveting two curved angle-irons 58$^b$ to the upper edge of the wing 21 by the flange 57$^g$, the web 58$^a$ being curved.

The parts are assembled and united to the I-beams or sills 13 as follows: The plates 21, Fig. 10, have projections 67 extending in the same plane as the body of the plate, and from these projections extend the ears or flanges 22, provided with apertures 68, the location of the projections 67 being such as to permit them to be received within the upper and lower flanges or webs 16 17 of the I-beams 13. Each of the plates or wings 21 are riveted at their lower edges 69 to the flanges 56 of the base-plate, except adjacent the intermediate sections 54, the lower edge 69 of the wings having the same upward inclination as said flanges. The upper curved edges of the wings are secured to the pendent intermediate web 59 of the segmental T-irons, the pendent web being preferably located on the outside of the wings, so as to give breadth to the bearing of the tank course thereon, and the said edge preventing dropping of the cradle-pieces if the rivets shear or break. The lower web 61 of the chair or casting is seated within the flanges 56 of the base-plate and rests upon the central flat portion 54 thereof, both parts being provided with holes 70 71, permitting them to be riveted or otherwise secured together, the central portion of the bed-plate having an aperture 72 alining with the aperture 66 in the chair to permit of the passage of the king-bolt or other pivoting device, and to the under side of the central portion 54 of the bed-plate is secured a flat plate 73, forming the upper portion of the disk-shaped center bearing 74, having a king-bolt aperture 75 alining with the aperture 66 72 in the bed-plate and chair.

I have not shown or described any form of truck, as that may be as desired.

As thus constructed the body-framing comprises the center sills or I-beams passing through the central portion of the bolster and connected thereto by the ears on the plates 21 and laterally braced by the segmental T-irons or cradle-pieces, the I-beams resting on the compression-chair and the stays or braces extending between the end sills and the bolster. In this way the very light body-framing and bolster construction is provided, whereby it is possible to utilize commercial forms of iron in a very advantageous manner.

The tank, and specifically the courses 3 thereof, is secured to the bolster and the tank seated within and upon the T-irons or cradle-pieces of the bolster through the instrumentality of the transversely-disposed segmental liners 76, which are disposed above the T-irons within the tank course 3 and which are respectively riveted to the course and to the T-irons.

The tank longitudinally is stiff enough to require support at the ends only—that is, through the instrumentality of the two bolsters. Should, however, it be desired to support it otherwise than between the two bolsters, especially centrally of the tank, additional supports may be provided; but I prefer the present construction on the score of great lightness consistent with strength and rigidity, and more especially since I am enabled to support the tank on two points only without any connection with the sills.

The guide-blocks 77 of a conventional draft appliance are each secured to the inner side of the vertical webs 13$^a$ of the I-beams, as indicated in Figs. 2 and 3, in which is supported the rear end of the draw-bar 78, having the draw-head 79, all of conventional construction, and at 80 is a conventional strap secured to the abutment-block 40.

The ends of the frame which extend beyond the end header 4 of the tank are provided with a platform comprising a plate 81, laid over the braces 28 and suitably supported on the braces 27, the I-beams, and a portion of the upper flange 19 of the end sills, the plate 82, having the horizontal web 83 secured to the web 19 of the end sill, and a vertical web 84, against which abuts a portion of a buffer-block 85, Fig. 2, suitably secured to the end sills, the platform carrying the usual brake windlass-bars 86.

The tank is provided with a running-board and associate devices as follows: Between the dome and extending over the top of the tank beyond its ends and over the end platform are a plurality of plates 87, secured together and supported on the tank by Z-shaped supports 88, which may be of varying height, if it is desired to place the plates horizontal, or which may be of equal height to save weight, if a slight inclination is to be given to the plates to correspond to the drop of the tank courses, and the running-board thus constructed is connected on each side of the tank by a circular piece 89, supported by Z-shaped supports 90, having their ends secured, respectively, to the plate and the tank course. The ends of the plates 87 are held together by an angle-iron 91, and another iron 92 is secured to one of the plates, from which depends a ladder 93, comprising uprights 94 and wings 95, the uprights being secured to the plate 91 and braced together at the top by the angle-pieces 96 and at the bottom to the plate 97. The platforms are provided with the hand-grips or uprights 98 and with steps 99 and the running-board with a guard-rail 100 and grips 101.

From the foregoing it will be apparent that many of the features herein described can be eliminated without affecting the broad features of the construction hereinafter set forth, and as to this they may be variously embodied without departing from the spirit of my invention.

I claim—

1. In a tank-car, the combination with a frame comprising the juxtaposed and continuous longitudinal sills, cross-sills secured to the longitudinal sills at their ends, the curved and upwardly-extending body-bolsters secured to the longitudinal sills adjacent the end sills and extending beyond the longitudinal sills, and a tank or body secured to the body-bolsters.

2. In a tank-car, the combination with the tank, the I-beams, the bolsters having segmental cradle-pieces, a laterally-disposed segmental liner located interiorly of the tank and secured respectively to the tank and cradle-pieces.

3. A car comprising a tank, a frame consisting of a plurality of closely-juxtaposed longitudinal sills, end sills connecting the longitudinal sills, and bolsters secured to the longitudinal sills through which the latter extend, the bolsters extending outwardly from the longitudinal sills and constituting cradles for receiving the tank, and means for tying the extended ends of the bolster and end sills together.

4. In a car, the combination with a frame, comprising the central sills, the cross-bolsters through which the central sills pass, the end sills, the stays secured between their ends and disposed between the bolsters and end sills, and a tank seated upon and secured to said bolsters.

5. The car-framing consisting of the end sills, the longitudinal sills extending between the end sills between the latter's outer ends, bolsters comprising vertical plates secured to the longitudinal sills, and diagonally-disposed braces secured together between their ends and extending between the vertical plates and the end sills.

6. The car-framing comprising the longitudinally-disposed I-beams, the end sills secured to the ends of the I-beams, the bolsters having vertical plates, and a plurality of braces secured together between their ends and diagonally disposed between the I-beams, bolsters, and end sills.

7. The combination with the end sills, the centrally-located longitudinal sills, comprising I-beams secured to the end sills, of a casting extending between the vertical webs of the longitudinal sills and adjacent to the end sills, the casting being provided with longitudinal and transverse webs running parallel to said sills, and means whereby a draw-bar may be run through the lower portion of the said casting.

8. The combination with the end sills and bolsters, the longitudinal sills comprising I-beams secured to the end sills intermediate of the latter's ends, and cross-braces secured to the vertical webs of the longitudinal sills between the beam-flanges.

9. The combination with the end sills and bolsters, the longitudinal I-beam sills, and the diagonal braces connecting the longitudinal sills, bolsters and end sills and secured to the vertical webs of the beams between their flanges.

10. The car-framing comprising the longitudinal and end sills, bolsters secured to the longitudinal sills, diagonal braces extending between the longitudinal sills, and cross-braces extending between the end sills and bolster.

11. The combination with the end sills, longitudinal sills, cross-bolsters secured to the longitudinal sills, braces extending intermediate of the bolsters, the longitudinal sills and end sills, and diagonal cross-braces extending between the longitudinal sills between the bolsters.

12. In a tank-car, the combination with the end sills, the central longitudinal sills secured to the end sills, bolsters through which the longitudinal sills extend, the bolsters extending outwardly from the longitudinal sills, and a circular tank, the upper section of the bolsters being disposed concentrically with the tank to receive the same, the end sills and bolster extensions being secured together outside of the longitudinal sills.

13. In a car-frame, the combination with the longitudinal sills, of the bolster comprising a base or bed member, and an interposed chair forming a support for said sills, vertical plates secured to the said base member and to the sills, and segmental cradle-pieces secured to the upper edges of the bolsters.

14. In a tank-car, the combination with the tank, of the sills, a sill-chair, a bolster comprising a bed-plate, plates or wings extending upwardly therefrom, and lateral extensions from the upper edges of said plates overlapping said edges and receiving the tank.

15. In a tank-car, the combination with the tank, of the sills, a sill-chair, a bolster comprising a bed-plate, plates or wings extending upwardly therefrom, the upper edges of which are downwardly curved, and downwardly-curved lateral enlargements secured to the curved edges of said plates or wings, the tank being secured to the said enlargements.

16. In a tank-car, the combination with a tank, of bolsters comprising a bed or base plate, the vertical side plates secured to the base-plate and intermitted between their ends to form an opening therethrough, the segmental cradle-pieces secured to the upper edges of the plates and extending over the opening, the longitudinal sills extending through said opening and beyond the cradle-pieces, means including sill-chairs for securing the bolsters to said sills, the tank being secured to the cradle-pieces.

17. The combination with the sills, the bolster-chair, the bolster base-plate, the vertical side plates or wings secured to the base-plate and to the sills, the sills resting on the chair, and the segmental cradle-pieces secured to the upper edges of the wings.

18. In a tank-car, the combination with the tank, the longitudinal sills, a sill-chair, and a bolster comprising a base-plate, vertically-disposed wings having laterally-disposed flanges, segmental cradle-pieces secured to the wings, and the tank being secured to the said cradle-pieces.

19. In a tank-car, the combination of the bolster comprising the base-plate having the central flat portion and upwardly-inclined extensions therefrom, the vertical plates secured to the sides of the base-plate, segmental cradle-pieces secured to the upper edges of the vertical plates, the central sills secured to the said plates over the central flat portion of the base-plate, and a tank secured to said cradle-pieces.

20. In a tank-car, the combination with the sills, of the bolster comprising the base-plate having a central flat portion and outwardly and upwardly inclined ends, vertical plates or wings secured to said inclined ends, the segmental cradle-pieces secured to the upper edges of said wings, and a tank secured to the said cradle-pieces.

21. The combination in a tank-car, of the bolster comprising a base-plate, the compression-chair secured centrally thereto, the vertical plates or wings secured to the base-plate, the longitudinal sills resting on the chair and secured to the wings, the segmental cradle-pieces secured to the upper edges of said wings, and a tank secured to the cradle-pieces.

22. In a car, the combination with the flanged longitudinal sills and sill-chairs, of the flanged bolster base-plate extending transversely beyond said sills, vertical wings secured to the base-plate outside of the sills and having angular extensions projecting into the angle formed by the horizontal flanges of the sills, lateral projections from the extensions secured to the vertical webs of the sills, and the segmental cradle-pieces secured to the upper edges of the wings and extending over said sills.

23. In a tank-car, the combination with a bolster comprising the base-plate having upright flanges, vertical plates or wings secured to said flanges, longitudinal sills secured to the plates, the segmental cradle-pieces having depending webs secured to the upper edges of said wings, and a tank secured to the said cradle-pieces.

24. In a tank-car, the combination with a bolster comprising the flanged base-plate, the vertical wings secured exteriorly to said flanges, and cradle-pieces which have a segmental longitudinal web and a segmental vertical web secured to the side of the vertical wings, the upper edges of said wings lying within the plane of said horizontal web, longitudinal sills secured between the inner ends of the wings, and a tank secured to said cradle-pieces.

25. The combination with the longitudinal sills, of the bolster extending laterally beyond the sills, a compression-chair interposed between the bolster and said sills, and a body-center bearing secured to the bolster below the chair.

26. In a car-frame, center sills, cross-sills, means for connecting said cross and center sills, and an angle-plate on said cross-sill, and a buffer sustained by said cross-sill and angle-plate.

27. In a car-frame, a cross-sill, an angle-plate resting on said sill, and a buffer attached to said cross-sill, and having its upper portion resting against said angle-plate.

28. In a car-frame, a cross-sill, center sills, means for connecting said cross and center sills, a plate resting on said sills, and a vertical rod forming a hand-grip fixed in said cross-sill.

29. As an article of manufacture, a compression-chair comprising a rectangular base, vertical webs extending from each side of said base, transverse webs uniting the center of said vertical webs and a hole extending through the center of said base and intersection of said transverse webs.

30. As an article of manufacture, a thimble comprising perforated ends connected by two opposite side pieces and a vertical web, a transverse web connecting said vertical web and side pieces, a recess under said transverse web, and a beveled web connecting said ends and forming the walls of said recess.

31. As an article of manufacture, a tank for cars and the like comprising a central ring, and other rings extending in each direction toward the ends of the tank, each succeeding ring being of reduced diameter, and headers inserted in the end rings.

32. In a car-frame, center sills, a bolster, a cross-sill, and cross-braces uniting said bolster, center sills and cross-sills.

33. As an article of manufacture, a bolster comprising vertically-extending wings, cradle-pieces resting on said wings, a base-plate on which said wings rest, and a compression-chair also resting on said base-plate.

Signed at the city, county, and State of New York this 21st day of November, 1901.

CORNELIUS VANDERBILT.

Witnesses:
EDWIN C. FARLOW,
L. A. SHEPARD.